United States Patent
Deschamps et al.

(10) Patent No.: US 7,297,301 B1
(45) Date of Patent: Nov. 20, 2007

(54) PROCESS FOR TRANSFORMING PRE-USED ASPHALTIC ROOFING SHINGLES INTO PRODUCTS

(76) Inventors: Maurice Deschamps, 220 Oakhill Dr., Brantford (CA) N3T 5LY; Robert Simpson, 967 Highway 8. RR1, Dundas (CA) L9H 5E1

( * ) Notice: Subject to any disclaimer, the term of this patent is extended or adjusted under 35 U.S.C. 154(b) by 172 days.

(21) Appl. No.: 10/614,064

(22) Filed: Jul. 8, 2003

Related U.S. Application Data

(60) Provisional application No. 60/394,787, filed on Jul. 11, 2002.

(51) Int. Cl.
*B29C 43/02* (2006.01)
*B29B 9/04* (2006.01)
*B29B 11/12* (2006.01)

(52) U.S. Cl. .................. 264/115; 264/122; 264/125; 264/140; 264/325; 264/913; 264/915; 264/DIG. 32

(58) Field of Classification Search ............... None
See application file for complete search history.

(56) References Cited

U.S. PATENT DOCUMENTS

| | | | |
|---|---|---|---|
| 194,776 A | 9/1877 | Hull | |
| 1,290,954 A | 1/1919 | Ford | |
| 1,732,281 A | 6/1929 | Robinson | |
| 2,368,371 A | 1/1945 | Minge | |
| 3,664,592 A | 5/1972 | Schwecigerg | |
| 3,825,192 A | 7/1974 | Knight | |
| 4,189,238 A * | 2/1980 | Mendenhall | 366/7 |
| 4,222,851 A | 9/1980 | Good | |
| 4,325,641 A | 4/1982 | Babus | |
| 4,706,893 A | 11/1987 | Brock | |
| 5,098,025 A | 3/1992 | Drouin | |
| 5,201,472 A | 4/1993 | Brock | |
| 5,221,338 A | 6/1993 | Gaudio | |
| 5,221,702 A | 6/1993 | Richards | |
| 5,223,032 A | 6/1993 | Gaudio | |
| 5,236,497 A | 8/1993 | Grzybowski | |
| 5,337,965 A | 8/1994 | Chiovitti | |
| 5,340,038 A | 8/1994 | Omann | |
| 5,344,485 A | 9/1994 | Glynn | |
| 5,367,007 A | 11/1994 | Richards | |
| 5,385,426 A | 1/1995 | Omann | |

(Continued)

FOREIGN PATENT DOCUMENTS

| | | | |
|---|---|---|---|
| CA | 2190538 | * | 5/1998 |

(Continued)

OTHER PUBLICATIONS

Brochure for the HC 2400B Portable Heavy Duty Waste Recycler. Source: www.petersonpacijic.com, Downloaded Apr. 2003.

*Primary Examiner*—Edmund H. Lee

(57) ABSTRACT

A process for transforming pre-used asphaltic roofing shingles into products such as paving bricks, by removing foreign matter, using a comminutor that pulls shingles downwardly through a plurality of pairs of high-speed, counter-rotating, inter-meshing blades stacked within a housing; classifying the particles, applying a release agent to the inside of the mold, charging the mold with a predetermined weight and size distribution of particles, compressing the material in the mold at high pressure, and ejecting the formed material from the mold for delivery to customers. The brick and other products are included in the scope of the application.

11 Claims, 1 Drawing Sheet

U.S. PATENT DOCUMENTS

Figure 1:
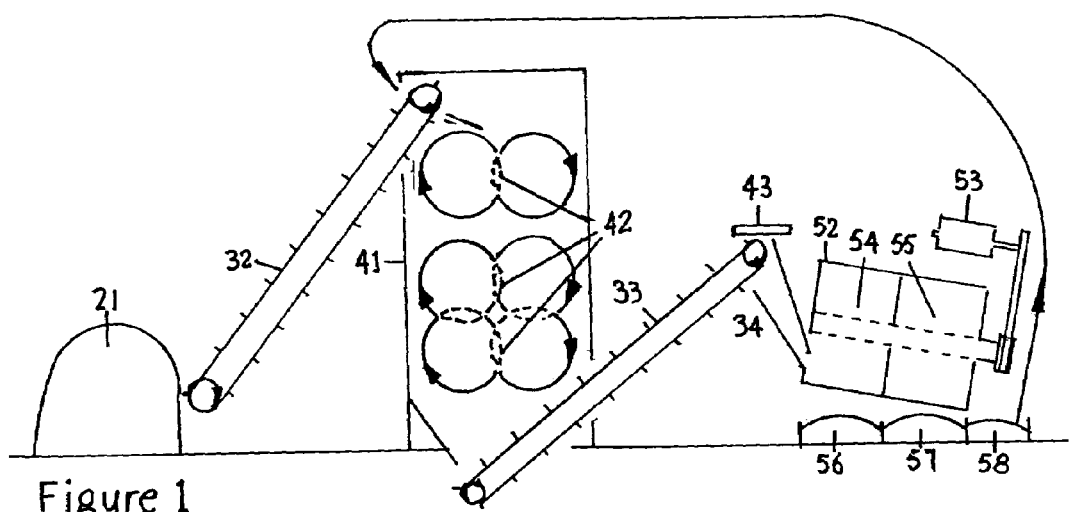

| | | |
|---|---|---|
| 5,511,899 A | 4/1996 | Pavelek |
| 5,626,659 A | 5/1997 | Chivers |
| 5,848,755 A | 12/1998 | Zickell |
| 6,039,914 A | 3/2000 | Gehrke |
| 6,497,930 B1 | 12/2002 | Petermeier |
| 7,052,635 B2 * | 5/2006 | Mischo ............ 264/115 |
| 2002/0011687 A1 | 1/2002 | Mischo |

FOREIGN PATENT DOCUMENTS

| | | |
|---|---|---|
| CA | 2148878 | 4/2001 |

* cited by examiner

PROCESS FOR TRANSFORMING PRE-USED ASPHALTIC ROOFING SHINGLES INTO PRODUCTS

CROSS-REFERENCE TO RELATED APPLICATION

This application is entitled to the benefit of Provisional Patent Application Ser. No. 60/394,787 filed on Jul. 11, 2002.

STATEMENT REGARDING FEDERALLY SPONSORED RESEARCH OR DEVELOPMENT

Not Applicable.

REFERENCE TO A 'MICROFICHE APPENDIX'

Not Applicable.

BACKGROUND OF THE INVENTION

1. Field of Invention

The invention relates generally to waste recovery and recycling, and specifically to a process for transforming pre-used asphaltic roofing shingles into paving bricks.

2. Background of the Invention

Up to 11 million tons of asphaltic roofing shingles are disposed of annually in North America. Possibly 20% of this material comprises unused shingle manufacturing waste that can be incorporated into hot-mix asphalt. The remaining 8 million tons is pre-used weathered shingles called 'tearoffs'.

A small but growing quantity of these pre-used shingles is being comminuted and used in several applications such as low-value suppressant of dust on minor roads and parking lots; as aggregate in road construction and maintenance; as an additive both to cold and hot mix paving asphalt; and in the manufacture of hot-molded paving bricks or blocks.

The bulk of the 8 million tons is, however, land filled.

No product has been manufactured through compression of cold shingle particles to the best knowledge of the inventor. U.S. Pat. No. 6,039,914 awarded to Gehrke in 2000 indeed explicitly excludes that possibility. The inventor, however, has invented a suitable shredder and discovered mold release agents. Their novelty enables advantageous cold-shredding and cold-forming of bricks from shingles. In combination they represent a novel process.

The transformation of asphaltic shingles into products requires skill in the two arts of comminution and of subsequent aggregation or dissolution into a mix. It is a characteristic of asphalt that its viscosity decreases with increasing temperature. Therefore those skilled in the prior art appreciate that in general shingle comminution requires low temperatures in order to prevent the material from aggregating and sticking to the equipment, while the aggregation of shingle particles or their dissolution into a mix requires heat.

The heating of asphalt is costly. It also becomes sticky, hard to handle, and potentially harmful as it releases particulate matter and reactive organic gasses, possibly including volatile organic compounds. The avoidance of heat is therefore an obvious advantage.

Ford, U.S. Pat. No. 1,290,954 of 1919 was the first to patent a method of reclaiming unused asphalt shingles. He taught chilling or freezing the material prior to grinding, and molding the particles through pressure at an undisclosed temperature into products such as waterproof containers. Ford rejected previous attempts to add hot solvent to comminuted shingles due to high demands for power and heat. Contemporary grinders would have been of the type patented by Hull, U.S. Pat. No. 194,776 of 1877, using cooperating hammers or 'rubbers' attached to a cylinder and concave as in an agricultural thresher.

Robinson, U.S. Pat. No. 1,732,281 of 1929 invented a process of transforming small, unused shingle trimmings and punchings from manufacturing waste that avoided the need for comminution. He designed a screw apparatus with a succession of shearing actions to heat and agglomerate the material at temperatures as high as 265° F. (129° C.) into a plastic mass suitable for forming into products.

Minge et al, U.S. Pat. No. 2,368,371 in 1945 taught a method of comminuting unused shingles in a series of three high speed hammer mills, successively fitted with finer screens of 1½ inch, ¾ inch and ¼ inch. The first two mills operated at 1,850 rpm and the third at 3,500 rpm. To avoid the inherent problem of material heating and machine blockage, limestone was fed with the shingles into the second mill, while forced air provided additional cooling in the third mill. The particles were then mixed with asphalt heated to 500° F. (260° C.) to make a material suitable for use in the manufacture of shingles.

Schweigert et al, U.S. Pat. No. 3,664,592 in 1972 proposed a low-speed granulating or shearing device with any number of cooperating knives fitted with a piercing-cutting tooth mounted on two counter-rotating shafts. The low speed of 20 to 50 rpm avoided the problem of heating, but left relatively large pieces of shingle requiring further reduction in a high-speed hammer-mill. A patent for such a process was awarded to Drouin in 1992—see below.

Good, deceased et al, U.S. Pat. No. 4,222,851 in 1980 taught a method of recovering components from comminuted unused manufacturing waste shingles by solvent extraction at temperatures between 80 and 125° C. (176 to 257° F.) and at pressures between 5 and 100 p.s.i. This formed a miscella that was separated using evaporative techniques.

Babus, U.S. Pat. No. 4,325,641 in 1982 proposed the agitation of non-comminuted new manufacturing waste shingles in soft asphaltic oil at 300° F. (149° C.) to make a mix suitable for paving.

Brock, U.S. Pat. No. 4,706,893 in 1987 taught the combining of comminuted new and pre-used shingles into a hot-mix paving composition. Hot particles were added to appropriate quantities of liquid asphalt and aggregate, or of reclaimed roadway material. The proportion of shingles was limited by the capacity of the softest asphalt with a high penetration number of 250 to offset the hard asphalt in new shingles with a low penetration number of 11 and reach the standard penetration number of 50 to 60 for asphalt in hot-mix paving. The limit for adding shingles, some of which comprise 52% asphalt, was calculated to be within the range of 2 to 8%. This varied according to (a) the hardness of the added liquid asphalt, (b) on the proportion of asphalt in the shingle material, (c) its hardness, and (d) on the amount of recycled roadway with a hardness of 30 to 50. Brock also taught the use of a hog or hold-down conveyor invented by Knight, U.S. Pat. No. 3,825,192 in 1974. This controlled the flow of shingles into the hammer mill to avoid overloading. Brock, U.S. Pat. No. 5,201,472 in 1993 proposed a method of preparing shredded shingles for later use in a form that resisted sticking together.

Drouin et al, U.S. Pat. No. 5,098,025 in 1992 proposed fine comminution of pre-used and unused asphalt shingles achieved through successive reduction in a shredder and hammer mill. Water or solvent was added to prevent heating and aggregation. The liquid was then mixed with other slurries to create a pulp that was suitable for cold forming into asphalt fiberboard, or as a damp-proof coating.

Gaudio, U.S. Pat. No. 5,221,338 and U.S. Pat. No. 5,223,032 in 1993 proposed cold mixing of roughage derived from crushed concrete with recycled roadway in appropriate ratios with comminuted pre-used shingles and light oil. The product was used for pavement construction and repair.

Richards, U.S. Pat. No. 5,221,702 in 1993 invented a method of hot molding an interlocking paving brick of 200×100×60 mm or 80 mm (8×4×2.5 inches or 3 inches) from a mixture of recyclables such as polyethylene bottles, tires and pre-used shingles, with asphalt comprising 40% by volume. The mixture was heated to a temperature of 325 to 375° F. (163 to 191° C.) and compressed at a pressure of 750 psi, with the hot mold submerged in cold water. Richards, U.S. Pat. No. 5,367,007 in 1994 taught a process for manufacturing a multi-layered composite block from the same material.

Grzybowski U.S. Pat. No. 5,236,497 in 1993, taught how to use a mixture of comminuted new and pre-used asphalt shingles as the dominant, and possibly sole, source of bitumen in a cold-patch material suitable for pavement repairs.

Chiovitti, U.S. Pat. No. 5,337,965 in 1994 invented a way of mechanically recovering and separating the asphalt/fiber and aggregate components of new and pre-used shingles by agitating comminuted shingles in a water tank.

Omann, U.S. Pat. No. 5,340,038 in 1994 proposed a comminutor comprising a plurality of cutter bars to kick, pull apart, cut and shear material such as wood, concrete and new and pre-used shingles aggregated in substantial clumps. Gross particles were produced requiring further reduction in a hammer mill. See below the patent awarded to Omann.

Glynn, U.S. Pat. No. 5,344,485 in 1994 taught a method of preparing a cold emulsion of asphalt, water, pumice, soap, and caustic soda in which to suspend, separate and mix aggregate with comminuted shingles and other recyclables such as shredded tires, plastics and glass, together with soils contaminated with petroleum or other hazardous materials. The proportion of shingles was 4 to 6% by weight. The product was a cold-mix concrete that set after expelling the water under pressure.

Omann, U.S. Pat. No. 5,385,426 in 1995 proposed using the comminutor patented by his brother (see above) to reduce shingles to large pieces that were further reduced in a succession of modified hammer mills cooled by compressed air or alternatively with water. The particles were then heated by microwaves to 200° F. (93° C.) for use in patching or paving roadways, or packaged for home use.

Pavelek, U.S. Pat. No. 5,511,899 in 1996 taught a method of laying down a road surface comprising conventionally comminuted pre-used shingles sandwiched between two layers of aggregate.

Chivers, U.S. Pat. No. 5,626,659 in 1997 proposed a method of reducing new and pre-used asphalt shingles to fine particles. Clogging of the comminutor was avoided by adding limestone or dolomite to shingles in any ratio up to 100:56. This permitted temperatures in the hammer mill to reach 300° F. (149° C.) without the material aggregating or sticking to the machinery.

Zickell et al, U.S. Pat. No. 5,848,755 in 1998 taught a method of heating uncomminuted asphalt shingles to about 350° F. (177° C.) in a milling apparatus and mixing in virgin liquid asphalt. The resulting paste could be poured or pumped for undisclosed uses.

Gehrke et al, U.S. Pat. No. 6,039,914 in 2000 disclosed a process for producing a paver measuring 4×8×2½ inches. He heated comminuted new and pre-used shingles under infrared heaters to a temperature of 130 to 150° F. (54 to 66° C.), and fed them into an extruder. The output was molded in two stages separated by a critical delay at a pressure of 60 tons, or the equivalent of 4,125 psi. Gehrke stated that an inferior and brittle block could be produced by pressure alone without heat, and that excessive heat decomposed part of the asphalt to ash that was brittle when aggregated.

Deschamps and Hanus, Canadian Pat. No. 2,148,878 in 2001 proposed a high-speed shredder that pulled shingles or other material downwardly through preferably three successive pairs of counter-rotating, intermeshing blades or knives within a housing. This reduced the material into successively smaller pieces quickly and without heating and without the use of sieves or grates. The design offered relatively simple and inexpensive construction with superior performance. This shredder forms an integral part of the process specified in this application.

Petermeier, U.S. Pat. No. 6,497,930 in 2002 taught how to form an interlocking paving brick from comminuted new and pre-used shingles heated to a temperature of 215 to 275° F. (102 to 135° C.) and pressed in a heated mold at a pressure of 300 to 760 psi.

Mischo, U.S. Patent Application Publication No. US2002/0011687A1 in 2002 proposed the comminution of shingles on a small scale with a conventional hammer mill. The output was sieved. The larger particles were used as material input for one product, while the remaining particles were heated to a temperature between 200 and 300° F. for extrusion and hot-molding into bricks and similar products.

With the sole exception of the Deschamps' shredder, these processes taught in the prior art are associated with various difficulties and disadvantages;

a. The processes taught by Babus and Brock for mixing treated asphalt shingles into hot mix asphalt composition limited the shingle proportion to 8%, and typically to 1%. The asphalt in new shingles, at times comprising 500% of the shingle by weight, was too hard (low penetration) for use in a hot mix containing only 6% asphalt. Furthermore only new shingles could be used because in pre-used shingles the asphalt was further oxidised and hardened to varying and unpredictable degrees by exposure to UV and air. Babus used only new shingles. Brock incorporated pre-used shingles, but compensated for their hardness by adding an offsetting quantity of soft high penetration asphalt. In practice the incorporation of pre-used shingles in hot-mix is difficult, complicated and severely limited. None of these factors applies in this application.

b. Conventional comminutors screen the particles internally by grinding and regrinding them until they are reduced sufficiently to pass through the sieve or grate. This action heats the material, which becomes plastic, and increases power consumption. The plastic material agglomerates and adheres to the machinery, eventually blocking the screen. The material then backs up, overheats, and stops the machine. The material cools to a rock-hard consistency that is difficult and time-consuming to remove. These difficulties are explained in Omann U.S. Pat. No. 5,385,426 in 1995 and Chivers, U.S. Pat. No. 5,626,659 in 1997. This application teaches how to avoid such problems.

c. Feeding a hammer mill with shingles that are clumped together can overload the shredder, as explained in Brock, U.S. Pat. No. 4,706,893 in 1987. He alleviated the problem by incorporating a hog. Such a device is not required in this application.

d. Some, including Omann, U.S. Pat. No. 5,385,426 in 1995, and Drouin et al, U.S. Pat. No. 5,098,025 in 1992, proposed the use of two comminutors; a slow-speed shredder for gross reduction and a high-speed hammer mill for fine reduction. The consequence was increased capital investment and maintenance, which are avoided in this application.

e. Drouin et al, U.S. Pat. No. 5,098,025 in 1992 proposed cooling shingles in the comminutor with water. This method is in common use today. For example, the HC 2400B hammer mill manufactured by Peterson Pacific Corp for comminuting wood, operates at 2,100 rpm with ½-inch grate. It is modified for use in shingles with strengthened cutters and larger water lines. However wet particles must be dried before being adding to hot asphalt because of the dangers associated with steam, which is explosive in the confines of a mold. The complication and cost of drying do not apply in this application.

f. Draining wet shredded particles and drying them in a heated rotating drum was proposed by Richards, U.S. Pat. No. 5,221,702 in 1993, by Gehrke et al, U.S. Pat. No. 6,039,914 in 2000, and by Petermeier, U.S. Pat. No. 6,497,930 in 2002. This created polluted water that could concern the regulatory authority, and influence their willingness to issue a certificate of approval. No discharges result from this application.

g. As an earlier alternative to cooling water, Minge et al, U.S. Pat. No. 2,368,371 in 1941 proposed blending the shingles with up to 20% sand or screenings to prevent agglomeration in the comminutor. This added material cannot however be separated out and is economical only when needed in the final product. The additional material increases the load on the comminutor and reduces the capacity to reduce shingles. No such disadvantage accompanies this application.

h. Another method for reducing heat build-up in the comminutor was to remove the screens and sieve the particles separately. Unacceptably large particles were returned to the front of the machine repeatedly until of the desired size. The percentage of such returns could be large, but are minor in this application.

i. The use of comminuted shingles as road aggregate, dust suppressant or as an additive to hot-mix asphalt has relatively low added value compared with the paving bricks and other products described in this application.

j. The need to maintain the heated shingle particles at a minimum of 212° F. (100° C.) required heating the weighing container and mold. This added cost and complication that are avoided in this application.

k. Gehrke et al, U.S. Pat. No. 6,039,914 in 2000, proposed a two-step compaction process with a delay of minutes between the steps. This added complication and reduced productivity. The factor is absent from this application.

l. Gehrke et al, U.S. Pat. No. 6,039,914 in 2000 taught the heating of particles to 130 to 150° F. (54 to 66° C.) and applying a pressure of 60 tons or 4,125 p.s.i. By contrast, in this application the particles are at ambient temperature and the pressure applied is substantially greater than 5,000 p.s.i., and preferably about 11,500 p.s.i.

m. Gehrke et al, U.S. Pat. No. 6,039,914 in 2000 stated that an inferior and brittle block could be produced by pressure alone without heat. It is assumed they referred to a pressure of 4,125 p.s.i., which is substantially lower than the process pressure used in this application.

n. Petermeier, U.S. Pat. No. 6,497,930 in 2002 proposed molding a brick at temperatures of 215 to 275° F. (102 to 135° C.) in a mold hotter than the particles. Even so, a low friction surface to prevent the plastic material from adhering to the mold was proposed in certain circumstances. This application avoids special surfaces and high temperatures.

In the preceding, the products into which shingles have been recycled relate almost entirely to road building, to road maintenance, or to formed and molded paving products, which is the subject of the present invention. The methods previously taught have employed temperatures ranging from 135° F. (54° C.) to 375° F. (191° C.), and pressures between 200 and 4,125 p.s.i. Only Gehrke et al, U.S. Pat. No. 6,039,914 in 2000 described the cold molding of paving bricks, which is the subject of the present invention, but explicitly rejected it for reasons including product performance.

BACKGROUND OF THE INVENTION—OBJECTS AND ADVANTAGES

Accordingly, several objects and advantages of this invention are:

(a) to provide a fast, reliable, durable and economical method of comminuting pre-used waste shingles (b) to provide a method of comminuting shingles that is not weather dependent (c) to provide shingle comminution without the associated difficulties of material heating and comminutor blockage (d) to provide a method of shingle comminution without additives such as water or sand, and to avoid the subsequent need for particle drying or sand removal (e) to provide a process of agglomeration that is tolerant of shingles delivered wet by the roofers, and avoids the cost of pre-drying either shingles or particles (f) to provide a comminutor that is relatively insensitive to over feeding with clumps of shingles (g) to provide a process that avoids the need to heat the particles in all circumstances (h) to provide a process that functions without admixture in the preferred embodiment. However the achievement of certain product characteristics such as hardness and resistance to abrasion may require adding various materials during or after manufacture (i) to provide a process that produces no waste or emissions, and uses up the entire shingle without waste with the sole exception of the cellophane strip that is applied at the factory to prevent shingles from sticking together when stacked and packaged (j) to provide a method of producing relatively high-value paving bricks and other products rather than low-value material for road construction and repair (k) to provide a cold aggregation process in order to avoid the cost and complication of heating the particles and mold (l) to provide a process using pressure substantially higher than 5,000 p.s.i., and preferably about 11,500 p.s.i., although the exact pressure employed may vary depending on the required product characteristics of surface hardness and aesthetics (m) to provide a process that compacts the particles in the product to a density of about 120 lbs per cubic foot (n) to provide a process that avoids the need to manufacture the mold with low friction internal surfaces (o) to provide a process with a one-step molding method (p) to provide a process with continuous rather than batch operation.

Other objects and advantages are:

(a) to provide a process that is modest in terms of machinery size, first cost, and demand for labour (a) to provide a process that is suitable for location conveniently close to sources of pre-used shingles, either within a factory located within a conurbation with many roofers, or mounted on a truck that can visit remote communities with few roofers where shingles are stockpiled until the amount is sufficiently large economically to warrant a visit (b) to provide a process producing a durable but infinitely recyclable product.

Further objects and advantages of the invention will become apparent from a consideration of the drawings and ensuing description.

SUMMARY

A process for transforming pre-used asphaltic roofing shingles into paving bricks and other useful products. It comprises the steps of: removing foreign matter, using a comminutor that pulls shingles downwardly through a plurality of pairs of high-speed, counter-rotating, inter-meshing blades stacked in a housing; classifying the particles; applying a release agent to the inside of the mold; charging the mold with a predetermined weight and size distribution of particles; compressing the material in the mold at high pressure; and ejecting the formed material from the mold for delivery as a product to customers. The brick and other products are included in the scope of the application.

DRAWING—FIGURES

Figure 2:
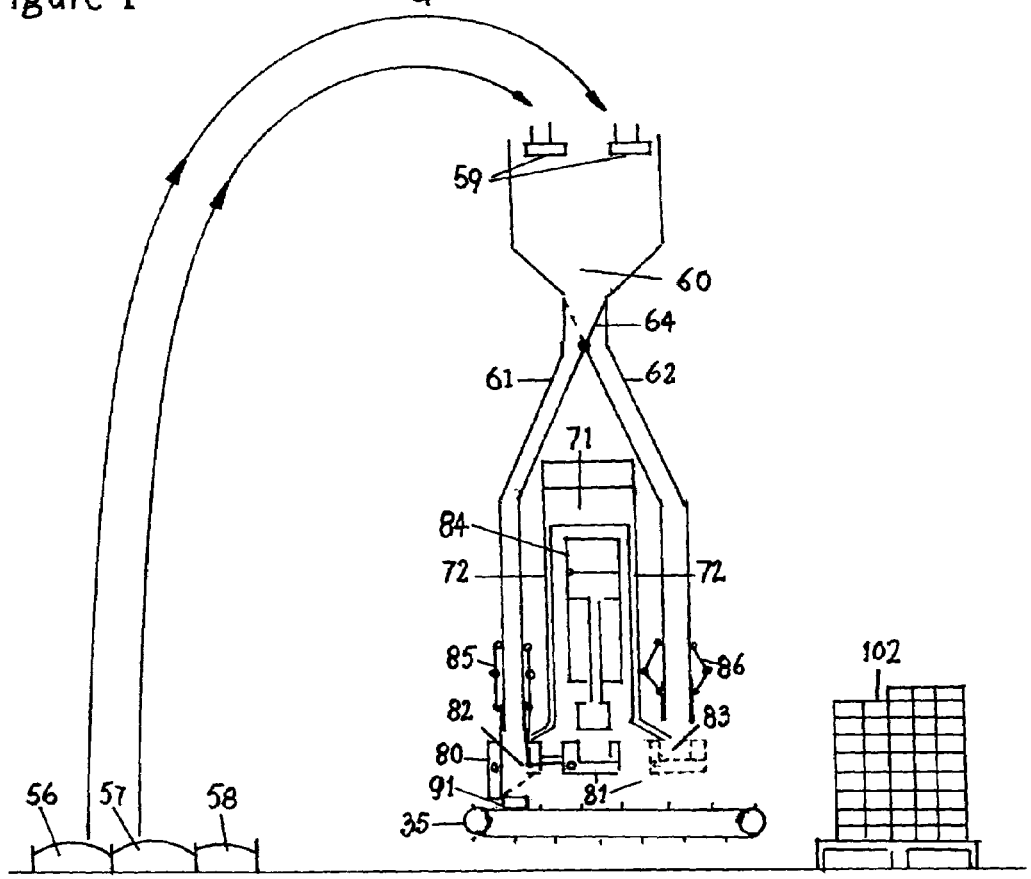

Referring to the drawing,

FIG. 1 and FIG. 2 represent an elevational view of the transformation process in its preferred embodiment.

Pre-used asphaltic roofing shingles in the form in which they are stripped from the roofs of buildings, together with the nails but less all the wood, metal flashing, rubber, roofing felt, paper, plastic wrapping, and other waste, which the roofing contractor has contracted to dispose of separately, are dumped onto a concrete floor 21. Alternatively, and not shown, the roofing contractor delivers shingles unseparated from the other roofing and waste materials, and is charged a premium for cleaning that is done in a separate part of the facility, where foreign material but not the nails is removed by operators from material dumped onto a sorting conveyor.

The cleaned shingles and nails are conveyed by a conveyor 32 to a comminutor or shredder 41 of a type in which the material to be shredded is pulled downwardly through a plurality of pairs of high-speed, counter-rotating, intermeshing blades 42 stacked within a housing. The blades are mounted preferably on three pairs of shafts so that the material undergoes three stages of reduction resulting in particle sizes ranging from air-borne powder to pieces approximately 1 inch (2.54 cm) and sometimes greater in diameter.

The particles are conveyed on a conveyor 33 under a magnet, preferably of the cross-belt type 43 where nails are removed for separate sale as scrap metal.

The particles are delivered to an open auger that is not shown. During the winter months when the shingles are delivered frozen and can contain ice, the particles are thawed in the open auger to a temperature of 50 to 59° F. (10 to 15° C.) by overhead radiant heaters that are not shown. The auger that is not shown delivers the particles to a chute 34 that enters a classifier fitted with screens that is preferably rotary 52, and driven by a motor through a belt 53. The first half of the classifier 54 is fitted with a screen containing holes of ¼ inch (0.635 cm) in diameter, and the remainder 55 of the classifier is fitted with a screen containing holes of 1 inch (2.54 cm) in diameter.

Particles greater than 1 inch in diameter 58 that fail to pass through the screens are returned to the front of the comminutor. Particles that are classified as smaller than ¼ inch (0.635 cm) 56, and particles that are classified as between ¼ inch (0.635 cm) and 1 inch (2.54 cm) in size 57 are separately weighed on scales 59, and combined to form a charge 60 for molds configured in the shape of the product, and mounted in a press arrangement.

This arrangement can be a shuttle frame with two molds 80 and 81 switching back and forth between three stations that are in line. At each of two outside stations 82 and 83 a mold is prepared, charged and discharged, and at the middle station a press 84 presses the particles at high pressure.

In an alternative embodiment that is not shown, the molds are fitted to an indexing table that moves the molds between four or more stations.

The pre-weighed charge of particles is directed into one of two feed chutes 61 and 62 by a gate 64. Each chute has an extender to eject the brick from the molds, shown extended 85 and retracted 86. Each mold has a hinged base, through which a brick 91 is released onto a conveyor 35.

The release agent is contained within a tank 71 and directed under pressure through pipes 72 to the molds, which receive a thin coating prior to accepting a charge of material through the feed chutes.

A sequence comprises: close mold bottom; spray or wipe release agent into the mold; charge mold with a predetermined weight of particles through the feeding chute; shuttle mold left or right as appropriate to a position under the press; lower press plunger into the mold cavity; hold the pressure for a set period of time to ensure compression has ceased; withdraw plunger; shuttle mold to left or right as appropriate; open the bottom of the mold; extend the feed chute, which acts to eject the brick or other product; and restart the sequence.

The ejected brick or other product 91 is conveyed on a conveyor 35 to a location where it is stacked 102 on a pallet and secured for later delivery to a customer.

Those skilled in the prior art have taught how to manufacture bricks at relatively high temperatures greater than 130° F. (54° C.), and most often greater than 212° F. (100° C.), and at relatively low pressures not exceeding 5,000 p.s.i., and most often lower than 1,000 p.s.i. They have taught the use of heat to reduce viscosity in order to prevent the product from sticking to the mold, and to permit its undamaged release from the mold. The present disclosure teaches the novelty of manufacturing bricks at average year-round ambient temperatures and at relatively high pressures that are substantially greater than 5,000 p.s.i., and preferably at about 11,500 p.s.i., using a release agent to prevent the product from sticking to the mold, and permitting its release undamaged from the mold.

DETAILED DESCRIPTION OF THE INVENTION

Detailed descriptions of the preferred embodiments are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Up to 8 million tons of pre-used asphaltic roofing shingles are removed from roofs annually in North America. Most is landfilled, while a small amount is comminuted and used as a low-value dust suppressant, or as an additive in hot-mix or cold-mix asphalt composition for road building and repair, or in the production of hot formed paving bricks or blocks and other products.

Turning first to FIG. 1 and FIG. 2 in the drawing, there is shown a new and practical process for transforming pre-used asphaltic roofing shingles in their entirety into products including paving bricks, paving blocks, paving slabs, kerbs, parking stops, devices for calming traffic, and imitation stone.

The process produces no residue or emissions. It is therefore suitable for location permanently or temporarily in proximity to roofers who are the source of the waste material.

The process utilizes some available and known technology, such as a conveyor, auger, cross-belt magnet, press, two-part mold, device for shuttling molds or for circulating molds on an indexing table under a press, programmable logic controller, and other known devices, controllers, machinery and methods.

The novelties in the present invention comprise; a) a comminuting device or shredder that has been invented and built by the inventor and for which he was awarded a Canadian patent, and b) a plurality of release agents that have been discovered by the inventors and not previously disclosed. The shredder and release agents are used in a process in novel combination with devices and equipment known in the prior art. This novel process operates within parameters that will be described and that are invented.

The shredder is preferred for many reasons. It does not heat and therefore modify the shingle material, which remains at the same or similar temperature during material reduction. The shredder cannot easily be overloaded. It produces particles having a distribution of sizes up to approximately 1 inch (2.54 cm) in diameter with only a fraction that is larger. The great bulk of the particles are suitable for forming into paving bricks and other useful products.

It has been found that the use of two known release agents, which are canola oil that is known also as oilseed rape oil, and diluted dishwashing liquid, permits agglomeration of cold particles in an unheated mold under high pressure. This pressure is substantially greater than 5,000 p.s.i., and is preferably at about 11,500 p.s.i. The exact degree of pressure will depend on the required product characteristics of surface finish, which is believed to have implications for durability and abrasion resistance, and of aesthetics. The release agent permits release of the formed brick from the mold on application of low pressure and without damage to the product. This is a novelty, and until it was observed and is hereby disclosed, those skilled in the art have taught that release of the agglomerated mass from the mold required pre-heating both of the mold and of the particles to reduce viscosity.

However, it has also been found that in order to form an acceptable brick without a loosely packed corner or corners, the particles must be distributed evenly within the mold, and the corners of the mold must be uniformly packed with particles. Particles do not flow within the mold but remain in solid form. Therefore if one corner is over packed relatively to another corner, the particles in the over packed corner will be compressed to the level of maximum compressibility. The degree of pressure required to achieve maximum compressibility is unknown, and almost certainly varies according to the distribution of particle sizes in the mold. However it is known that it occurs in all cases at a pressure substantially below 11,500 p.s.i. When maximum compressibility occurs in an unevenly packed mold, the male part of the two-part mold is prevented from advancing deeper into the female mold cavity. Thus one or more of the corners will be pressed to the maximum, while one or more of the corners will be loosely pressed. When a corner is loosely pressed, it lacks strength and cohesion and will crumble over time. The particles must therefore be distributed evenly within the mold in order to make an acceptable brick or other product.

It has also been found that the thickness of the brick varies according to the weight of the particles used to charge the mold that is configured in the shape of a product, and varies also according to the proportion of larger to smaller material in the charge. Therefore in order to produce bricks of a uniform thickness, it has been found necessary to classify the particles that are smaller than 1 inch (2.54 cm) into two fractions that are smaller or larger than ¼ inch (0.635 cm), and to weigh an amount from both classifications separately, and to combine the two prior to placement within the mold.

The effect of combining high pressure with uniform packing is a product with a density of about 120 lbs per cubic foot.

In some applications or products uniform thickness is not a customer requirement. In such a case the charge for the mold can be approximated by making it from a predetermined volume of particles. Such a procedure is simpler and quicker than weighing the charge from two different sizes of sieved particles.

Many useful products can be made using the process described and herein disclosed, including anticipated commercial embodiments such as paving bricks, paving blocks, paving slabs, kerbs, parking stops, devices for calming traffic, and imitation stones. Materials such as coloured stone chips, shredded or comminuted glass and plastic, letters and emblems may be incorporated permanently into the surface layer of the products by being placed in the mold before the normal charge of shred. These materials provide an identity, an advertising message, a specific surface finish or a colouration. Additionally the product is suitable for painting.

The shingles are usually by arrangement delivered and offloaded by the roofer in a form devoid of foreign material except nails. This starts a process comprising several steps. The shingles are first checked to ensure the absence of all non-shingle material other than nails. The shingles are then placed on a conveyor belt and conveyed to the comminutor or shredder in which they are pulled downwardly through a plurality of pairs of high-speed, counter-rotating, intermeshing blades turning at 1,100 to 1,400 rpm, stacked within a housing. The shingles are successively reduced by virtue of being impacted and sheared apart by the series of intermeshing blades. This type of shredder is reliable, relatively insensitive to irregularity of feed, relatively inexpensive to build and maintain, without screens or grates that can be blocked, and does not heat the comminuted material to any detectable degree.

The particles are passed under a cross-belt magnet that removes the nails.

The particles are then sorted into three piles. One pile comprises particles smaller than ¼ inch (0.635 cm); another pile comprises particles larger than ¼ inch (0.635 cm) but smaller than 1 inch (2.54 cm); and a third pile comprises particles larger than 1 inch (2.54 cm), which are returned to the shredder. Predetermined amounts of particles from the other two piles are weighed and combined to form a charge for the mold.

In the preferred embodiments, the molds of the press are shuttled between three stations located in line, or attached to an indexing table and circulated through four or more stations.

In either arrangement the inside faces of the mold are first prepared by spraying or wiping with a thin coating of release agent. Two suitable release agents unknown in the art have been discovered from many scores that have been tried. More release agents, which might be cheaper or prove to have some other advantage, will likely be discovered given more time for procuring and testing. These so far unknown release agents are automatically included within the scope of this patent application, which would be delayed unreasonably if it were held back until every conceivable material can be procured and tried. Additional release agents when discovered by the applicant will be disclosed to the U.S. Patent Office.

One known release agent is oil derived by pressing seed from a plant called variously *brassica napus oleifera*, canola, and oilseed rape. The oil is effective when used either in undiluted form or when mixed with a dispersal agent of alcohol in a commercial aerosol embodiment called Pam® Cooking Spray. The other known release agent is dishwashing liquid, such as Palmolive®, although other dishwashing liquids work equally well, used undiluted or preferably diluted with water in the ratio of 1 to 9, or ten percent.

The prepared mold is then charged with pre-determined weights of particles as previously described, and subjected to any amount of pressure but always substantially greater than 5,000 p.s.i., and preferably about 11,500 p.s.i. This pressure is always beyond the point of the material's maximum compressibility.

The pressure is maintained for 2 to 3 seconds, which is approximately how long it takes for the particles to reach the stage of incompressibility, and to form a bond. After the male element of the two-part mold is withdrawn, the mold is moved to a station where the bottom of the mold is opened and the finished product is positively ejected, which requires little force that nevertheless varies according to the amount of release agent used.

In the preferred embodiments, the molds are attached to a shuttle arrangement or to a circular indexing table. The principles in both cases are the same, and the arrangement is chosen for reasons of design, manufacturing convenience and cost.

With the shuttle arrangement, the molds are switched between the press station and two identical stations where the mold is opened, emptied, closed, prepared with a release agent, and charged.

In the indexing table arrangement, the molds move between four or more stations. At one station or stations the release agent is sprayed or wiped into the mold. At another station or stations the mold is charged with a predetermined weight and size of shred, as previously explained. The mold is circulated to another station or stations under the press where the appropriate pressure as previously explained is applied for the appropriate period of time as previously explained. The mold then moves to another station or stations where the bottom of the mold is opened and a ram ejects the finished product.

In an alternative embodiment, which is not preferred, a chain moves the molds on a carousel of rollers to the various stations. This arrangement has been found in practice to be inexact and unreliable.

In all embodiments the finished product after ejection from the mold is conveyed and inspected before stacking and packing on pallets for delivery to customers.

It is known that the application of some heat to either or both the shingles and the mold will change the product characteristics in terms of their surface aesthetics and surface wear characteristics. So although the preferred embodiment is for a process that operates at ambient temperature, an alternative embodiment will involve heating.

While the invention has been described in connection with two preferred embodiments and a third non-preferred embodiment, it is not intended to limit the scope of the invention to the particular forms set forth, but on the contrary, it is intended to cover such further alternatives, modifications, and equivalents as may be included within the spirit and scope of the invention as defined by the appended claims.

What is claimed is:

1. A process for transforming pre-used asphaltic roofing shingles into products comprising the steps of:
   (a) receiving said shingles without foreign material and with nails;
   (b) reducing said shingles into particles in a comminutor;
   (c) removing the nails from the particles by first means of a magnet;
   (d) separating the particles into three sizes;
   (e) returning the largest particles to the comminutor;
   (f) weighing a predetermined quantity of each of the two smaller sizes of particles as a second means to control product thickness;
   (g) combining the two predetermined quantities into a charge;
   (h) procuring an empty mold configured to the shape of the product;
   (i) covering the inside faces of said mold with a release agent;
   (j) charging the mold with the charge;
   (k) distributing the charge evenly within the mold;
   (l) placing the charged mold in a press;
   (m) compressing the charge with high pressure;
   (n) maintaining said pressure until the charge is fully compressed to produce a formed material;
   (o) releasing the pressure;
   (p) removing the mold from the press;
   (q) opening the mold;
   (r) ejecting the formed material from the mold;
   (s) inspecting said formed material and delivering said formed material as product to a customer.

2. The invention as in claim 1 in which the comminutor pulls said shingles downwardly through a plurality of pairs of high-speed, counter-rotating, inter-meshing blades, stacked within a housing as a third means of reducing said shingles to particles at the about the same temperature.

3. The invention as in claim 1 in which the release agent is either canola oil or diluted dishwashing liquid as a fourth means for permitting cold-forming of the product.

4. The invention as in claim 1 in which the said pressure is substantially greater than 5,000 p.s.i. as a fifth means of creating a product with a density of about 120 lbs. per cubic foot.

5. The invention as in claim 1 in which the comminutor pulls said shingles downwardly through a plurality of pairs of high-speed, counter-rotating, inter-meshing blades, stacked within a housing, and the release agent is either canola oil or diluted dishwashing liquid, and the pressure is substantially greater than 5,000 p.s.i.

6. The invention as in claim 5 in which the pressure is about 11,500 p.s.i.

7. The invention as in claim 1 in which the said shingles are delivered with nails and with foreign matter that is removed after delivery as a sixth means of satisfying the requirements of some roofers.

8. The invention as in claim 1 in which the mold is charged with a predetermined volume of particles as a seventh means of simplifying the creation of the charge.

9. The invention as in claim 1 in which some heat is applied both to the particles and to the mold or to one and not to the other prior to pressing as a seventh means of changing the characteristics of the product.

10. The invention as in claim 1 in which material comprising coloured stone chips, letters, emblems, comminuted glass, and plastic are placed in the mold in advance of the charge as an eighth means of providing an identity, a message, a surface finish or coloration on said formed material.

11. The invention as in claim 1 in which the product comprises at least one of paving bricks, paving blocks, paving slabs, kerbs, parking stops, devices for calming traffic, and imitation stone.

\* \* \* \* \*